United States Patent [19]
Nitta et al.

[11] Patent Number: 5,622,730
[45] Date of Patent: Apr. 22, 1997

[54] HEAT-DISPLACING T-DIE

[75] Inventors: Satoru Nitta, Numazu; Ryuichi Wakita, Mishima, both of Japan

[73] Assignee: Toshiba Kikai Kabushiki Kaisha, Japan

[21] Appl. No.: 546,561

[22] Filed: Oct. 20, 1995

[30] Foreign Application Priority Data

Oct. 20, 1994 [JP] Japan .................. 6-255419

[51] Int. Cl.$^6$ .................................. B29C 47/16
[52] U.S. Cl. .................. 425/141; 264/40.1; 264/40.5; 425/466
[58] Field of Search ................. 425/141, 466, 425/461, 378.1; 264/40.1, 40.5, 176.1

[56] References Cited

U.S. PATENT DOCUMENTS

| | | | |
|---|---|---|---|
| 3,761,553 | 9/1973 | Richardson | 425/141 |
| 4,454,084 | 6/1984 | Smith et al. | 425/141 |
| 4,592,710 | 6/1986 | Reifenhauser et al. | 425/141 |
| 4,594,063 | 6/1986 | Reifenhauser et al. | 425/141 |
| 4,781,562 | 11/1988 | Sano et al. | 425/141 |
| 5,051,082 | 9/1991 | Hattori | 425/141 |

FOREIGN PATENT DOCUMENTS

| | | |
|---|---|---|
| 3053922 | 3/1991 | Japan . |
| 4005018 | 1/1992 | Japan . |
| 5-40993 | 10/1993 | Japan . |

*Primary Examiner*—Jay H. Woo
*Assistant Examiner*—Joseph Leyson
*Attorney, Agent, or Firm*—Cushman Darby & Cushman Intellectual Property Group of Pillsbury Madison & Sutro, LLP

[57] ABSTRACT

Disclosed is a heat-displacing T-die designed so that initial adjustment of a die slit gap can be made easily and accurately in an extensive range, and the controllability of heat-displacing actuators for the die slit gap is improved. A pair of lips are formed as flexible lips. Hand-operated die bolts arranged on one flexible lip, while die bolts adapted to be automatically operated by means of heat-displacing actuators are arranged on the other flexible lip. The arrangement pitch of the hand-operated die bolts is shorter than that of the automatically operated die bolts.

4 Claims, 4 Drawing Sheets

HEAT-DISPLACING T-DIE

BACKGROUND OF THE INVENTION

1. Field of the Invention

The present invention relates to a heat-displacing T-die used in an extruding machine for films, sheets, etc., and more particularly, to an improvement of a heat-displacing T-die designed so that a die slit gap formed between lips is adjusted by utilizing thermal expansion and shrinkage of die bolts.

2. Information of the Related Art

A T-die of this type has a pair of lips, fixed and movable or flexible. Die bolts are connected to the flexible lip in order to adjust a die slit gap formed between the fixed and flexible lips. The die bolts are used to adjust the die slit gap, thereby regulating the thickness of a film or the like to be formed.

Conventional T-dies include ones which are designed so that the die slit gap is automatically regulated by controlling the thermal expansion and shrinkage of heat-displacing actuators (e.g., Jpn. UM Appln. KOKOKU Publication No. 5-40993), besides ones in which die bolts are operated manually.

FIG. 5 shows a conventional T-die which is provided with reverse-acting actuators. A flexible lip 62 and a fixed lip 63 are formed on the distal ends of an A-die body 60 and a B-die body 61, respectively. A die slit gap 64 is defined by the respective opposite faces of the lips 62 and 63.

In the A-die body 60 having the flexible lip 62, a mounting flange 65 projects over the lip 62, and one end of a heat reverse-acting actuator 66 is fixedly screwed to the flange 65.

Basically, the heat reverse-acting actuator 66 is composed of a heat sleeve 68, which is coaxially penetrated by a die bolt 67, and an adjustable heater 69 fitted on the sleeve 68 so as to be intimately in contact with the outer peripheral surface thereof.

In this case, the T-die is a push-only die, and the distal end of the die bolt 67 penetrates a guide 71 for guiding it in movement relative to the heat sleeve 68, abuts against the flexible lip 62. An adjust screw 70 is connected to the proximal end portion of the die bolt 67. The force of pressure of the die bolt 67 can be initially adjusted by manual operation such that the screw 70 is screwed into the free end portion of the heat sleeve 68. Low-thermal-expansion coefficient cast iron or engineering ceramics, such as silicon carbide, is used as the material of the die bolt 67. On the other hand, the heat sleeve 68 and the adjust screw 70 are formed of steel and so on. The material of the sleeve 68 has a higher coefficient of thermal expansion.

In this reverse-acting actuator, the materials of the die bolt 67 and the heat sleeve 68 have different coefficients of thermal expansion, so that the free end portion of the sleeve 68 is extended upward by heat. Since the die bolt 67 is formed of low-thermal-expansion coefficient cast iron or engineering ceramics, its thermal expansion is lower than that of the heat sleeve 68. Owing to this difference in thermal expansion, the upper surface of its proximal flange and the lower surface move upward. Thereupon, the load of pressure on the flexible lip 62 is reduced, so that the die slit gap 64 can be widened. If the heat sleeve 68 is cooled, in contrast with this, the heat sleeve 68 shrinks to a higher degree than the die bolt 67. Accordingly, the die bolt 67 relatively acts so as to press down the flexible lip 62, whereupon the die slit gap 64 is narrowed.

Disposed on the downstream side of the T-die, therefore, is an infrared thickness indicator for use as a detector for measuring the thickness of the extruded film or the like. The film thickness can be automatically adjusted to a constant value by controlling the temperature of the heater 69 for heating the heat sleeve 68 in accordance with the result of the measurement by means of the thickness indicator.

As modern practical-use automatic T-dies of the heat displacing type, there are ones which are provided with push-and-pull heat-displacing actuators adapted to displace flexible lips in both push- and pull-directions, besides the push-only die shown in FIG. 5, and ones which are provided with a mechanism capable of automatically adjusting the die slit gap 64 by means of heat-displacing actuators with a fixed-side lip entirely or partially flexible.

In the case of the die slit gap adjustment by means of the heat-displacing actuators, however, the manipulated variable is small and the thermal expansion or shrinkage is low, so that the range of adjustment is narrow. Accordingly, the operation for the initial adjustment of the die slit gap is particularly troublesome.

In both pushing and pulling the flexible lip, in particular, the heater temperature must pass the dead zone as it changes covering both the heating and cooling sides, due to backlash between screw sections in engagement with the die bolt and the heat sleeve. Thus, the controllability is lowered considerably.

SUMMARY OF THE INVENTION

Accordingly, the object of the present invention is to provide a heat-displacing T-die designed so that initial adjustment of a die slit gap can be made easily and accurately in an extensive range, and the controllability of heat-displacing actuators for the die slit gap is improved.

In order to achieve the above object, according to the present invention, there is provided a heat-displacing T-die for adjusting a die slit gap between a pair of lips by pushing and pulling a plurality of die bolts in the width direction of the lips. The pair of lips are formed as movable lips. One of the movable lips has hand-operated die bolts arranged thereon, while the other has die bolts automatically operated by means of heat-displacing actuators. The arrangement pitch of the hand-operated die bolts is shorter than that of the automatically operated die bolts.

Each of the heat-displacing actuators may be a heat direct-acting actuator including a heater and a heat sleeve having one end fixed to a mounting flange of the die and the other end constituting a free end on the side nearer to the movable lip and having the heater fitted tight thereon, and preferably, each of die bolts is fixedly fastened on the free end side of the heat sleeve by means of a lock nut.

Alternatively, each of the heat-displacing actuators may be a heat reverse-acting actuator including a heater and a heat sleeve having one end fixed to a mounting flange of the die and the other end constituting a free end on the side remoter from the movable lip and having the heater fitted tight thereon, the heat sleeve being formed of a material having a coefficient of thermal expansion higher than that of the material of the die bolts, and preferably, each of the die bolts is fixedly fastened on the free end side of the heat sleeve by means of a lock nut.

Preferably, moreover, the heat sleeve has a male screw section threadedly in engagement with a female screw section of the mounting flange of the die, and is fixedly positioned in a manner such that nuts are fitted and tightened on the male screw section on both sides the mounting flange, individually.

According to the present invention, the hand-operated die bolts are used in combination with the die bolts which are automatically operated by means of the heat-displacing actuators. The die slit gap is initially adjusted by means of the hand-operated die bolts. During automatic operation of an extruding machine, the die slit gap is automatically adjusted to control the thickness profile by means of the heat-displacing actuators.

In initially adjusting the die slit gap by means of the hand-operated die bolts, a great operating force from the die bolts acts on the movable or flexible lips. Since the arrangement pitch of these die bolts is relatively short, moreover, the flexible lips can be deformed as required, and the range of adjustment can be widened.

Moreover, backlash can be removed by the additional use of the lock nut which serves to fasten each die bolt and the heat sleeve. Since the backlash is removed in this manner, there is no dead zone which bestrides the boundary between the heating up side and cooling down side of the heater temperature. Accordingly, the displacement of each flexible lip linearly changes with the extension or contraction of the heat sleeve, thus ensuring improved controllability.

DETAILED DESCRIPTION OF THE PREFERRED EMBODIMENTS

A heat-displacing T-die according to one embodiment of the present invention will now be described in detail with reference to the accompanying drawings.

Figure 1:
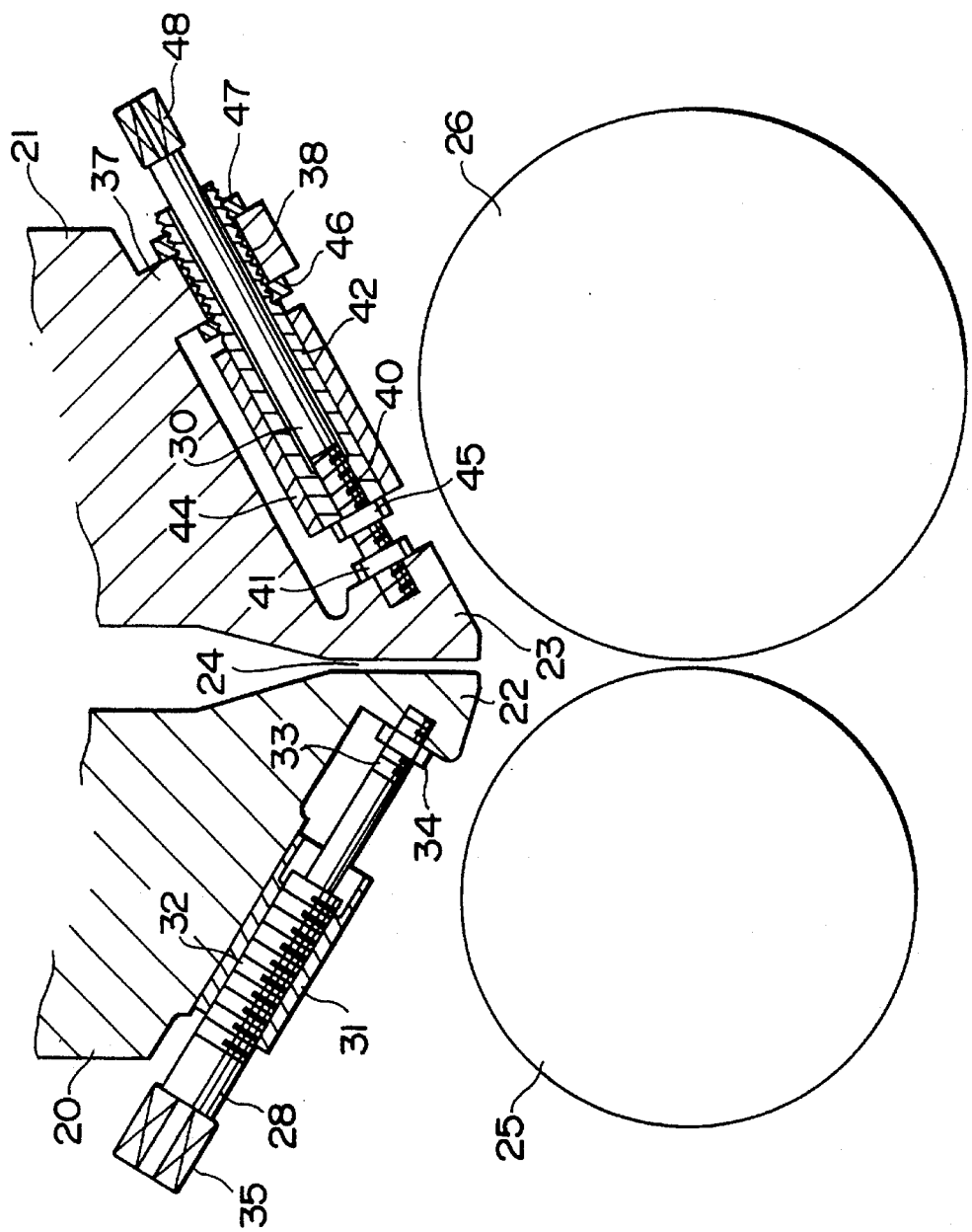
FIG. 1 is a sectional view showing a heat-displacing T-die according to one embodiment of the present invention provided with heat-displacing actuators of the heat direct-acting type.

FIG. 1 is a sectional view showing an arrangement of the present embodiment which is applied to an automatic heat-displacing T-die for biaxially oriented film formation.

The T-die which is attached to an extruding machine comprises first and second fixed die bodies 20 and 21. Each of these die bodies 20 and 21 has a flexible lip. More specifically, the die bodies 20 and 21 are provided with first and second flexible lips 22 and 23, respectively, which protrude from their respective lower ends so as to form a die slit between them. The respective opposite faces of the first and second flexible lips 22 and 23 define a die slit gap 24 through which a molten resin passes.

As the resin is extruded from the die slit gap 24, it is molded into a film, whereupon it is extruded into a gap between a pair of rolls 25 and 26 which are arranged on the lower-course side of the first and second die bodies 20 and 21. Then, the resin film is continuously drawn out from between the rolls 25 and 26.

Die bolts are used to adjust the die slit gap 24, including a predetermined number of hand-operated die bolts 28 for the first die body 20 and die bolts 30 for the second die body 21 which are automatically operated by means of heat-displacing actuators.

The hand-operated die bolts 28 are arranged in the width direction of the die along the first flexible lip 22 of the first die body 20. The arrangement pitch of the bolts 28 in the width direction is shorter than that of the heat-displacing die bolts 30 for the second flexible lip 23 of the second die body 21. For the case of a T-die with a width of 1,300 mm, for example, the arrangement pitches of the die bolts 28 and 30 may be adjusted to 20 mm and 30 mm, respectively. Thus, the die bolts 28 are arranged at shorter intervals.

Each hand-operated die bolt 28, which is of the push-and-pull type, has a male screw section 33 formed on its distal end portion. The die bolt 28 is joined to the flexible lip 22 by clamping the male screw section 33 by means of a lock nut 34 after screwing it into the flexible lip 22. The first die body 20 is provided with an internally threaded support portion 31. A male screw section 32 on the outer peripheral surface of each die bolt 28 is threadedly fitted in the support portion 31. Thus, the flexible lip 22 can be pushed or pulled by manually turning a head 35 of each die bolt 28 by means of a tool so that the die bolt 28 is advanced or retreated.

On the other hand, each automatically operated die bolt 30, which is of the push-and-pull type, has a male screw section 40 formed on its distal end portion and adapted to be threadedly in engagement with the flexible lip 23, and is joined firmly to the lip 22 by clamping the screw section 40 by means of a lock nut 41.

In this embodiment, a heat direct-acting actuator is used as the heat-displacing actuator which urges the die bolt 30 to push and pull the flexible lip 23. The direct-acting actuator is composed of a heat sleeve 42 and a sleeve heater 44 fitted tight on the sleeve 42. The die bolt 30 is coaxially inserted in the heat sleeve 42, and its male screw section 40 is screwed in a female screw on the free end side of the sleeve 42. The die bolt 30 is fastened to the heat sleeve 42 by means of a lock nut 45, in particular, lest it be loosened.

On the other hand, a male screw section 38 is formed on the fixed end side of the heat sleeve 42. The male screw section 38 is fixed by being clamped by means of first and second operating nuts 46 and 47 from both sides of a mounting flange 37 which protrudes from the second die body 21. The nuts 46 and 47 serve as lock nuts, and besides, are used in manually pushing and pulling the die bolt 30.

If the heat sleeve 42 is heated by means of the heater 44, in the heat-displacing actuator constructed in this manner, each die bolt 30 presses the flexible lip 23 to narrow the die slit gap 24 as the sleeve 42 undergoes thermal expansion. In contrast with this, the die slit gap 24 can be widened by cooling the heat sleeve 42.

In adjusting the flexible lip 23 in the push-direction by manual operation, on the other hand, the first operating nut 46 is tightened after first loosening the second operating nut 47 in advance. Thereupon, the heat sleeve 42 shifts its position toward the flexible lip 23, so that the lip 23 can be gradually pushed by means of the second die bolt which is connected to the sleeve 42. In adjusting the flexible lip 23 in the pull-direction, in contrast with this, the second operating nut 47 is tightened after first loosening the first operating nut 46. Thereupon, the heat sleeve 42 shifts its position away from the flexible lip 23, so that the lip 23 can be pulled.

The following is a description of the function of the present embodiment associated with automatic operation of the extruding machine.

First, the operation of the die bolts for the initial adjustment of the die slit gap 24 will be described.

In this initial adjustment, the hand-operated die bolts 28 are used in the main, with the automatically operated die bolts 30 fixed. In order to settle the position of each heat sleeve 42 on the side of the flexible lip 23, therefore, the lock nut 45 is tightened after individually tightening the first and second operating nuts 46 and 47 lest the relative positions of the sleeve 42 and the die bolt 30 be shifted.

Then, the flexible lip 22 is pushed or pulled to adjust the die slit gap 24. In this case, the die slit gap 24 is adjusted to a predetermined size by turning the hand-operated die bolts 28 by means of a tool. In the case of this adjustment of the die slit gap 24, a great operating force from the die bolts 28 can be applied to the flexible lip 22. Since the arrangement pitch of the bolts 28 is short, as mentioned before, moreover, the die slit gap 24 can be easily adjusted throughout a wide range.

Molding operation is started after the die slit gap 24 is initially adjusted in this manner.

The thickness profile of the extruded film is detected throughout its width by means of the thickness indicator, and the temperature of the heat sleeve 42 heated by the heater 44 is detected at the same time. The detected thickness profile is compared with a previously stored target profile, whereby the unevenness of the film thickness is calculated. In this automatic control mode, operation is started the moment profile formation is started. If the unevenness of the film thickness is smaller than a reference value, productive operation is started without changing the automatic control mode.

If the unevenness of the film thickness is greater than the reference value, on the other hand, the size of the die slit gap 24 is adjusted by manually operating the hand-operated die bolts 28 in the same manner as in the case of the aforesaid initial adjustment after changing the operation mode over to a manual operation mode. This is done in order to complement the adjustment by means of the hand-operated die bolts 28 with a great manipulated variable, since the lip displacement by the heat-displacing actuator is basically small. After it is confirmed that the unevenness of the thickness is reduced by the adjustment, the productive operation in the automatic operation mode is started.

As the automatic operation mode is continued in this manner, the movement of the die bolts 30, which are automatically operated by the heat-displacing actuators, is urged to change from a push stroke to a pull stroke.

Figure 2:
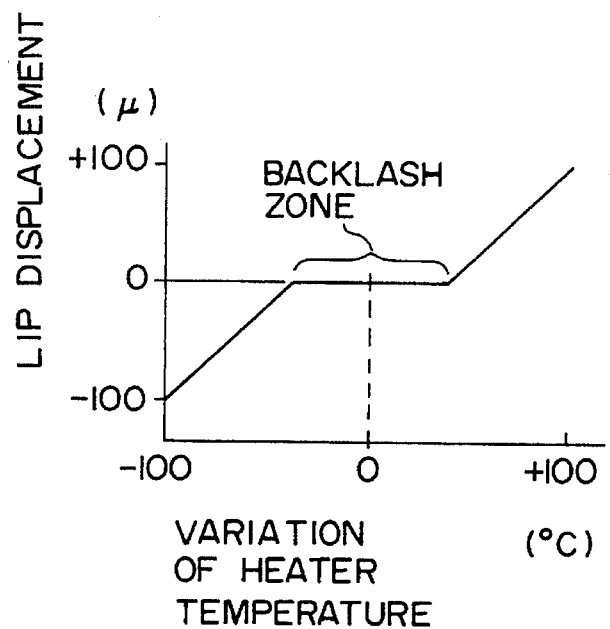
FIG. 2 is a view showing the relationship between the temperature and the displacement of flexible lips established when there is backlash at screw joint portions between die bolts and heat sleeves of the heat-displacing actuators.

In this case, there is backlash between the male screw section 40 of each die bolt 30 and the female screw section of the heat sleeve 42. The displacement of the flexible lip 23, which originally is proportional to the displacement of the heat sleeve 42 attributable to temperature change, is reduced by a margin corresponding to this backlash. FIG. 2 is a graph illustrating the relationship between the change of the temperature of the heater 44 and the displacement of the flexible lip 23 established when the backlash exists. In a certain range, the displacement of the heat sleeve 42 is countervailed by the backlash and cannot be associated directly with the displacement of the flexible lip 23 even though the temperature of the heater 44 is changed. In FIG. 2, a region where the displacement of the flexible lip 23 is zero corresponds to a backlash zone. The backlash zone bestrides the boundary between the heating up side and cooling down side of the heater temperature. After all, the lip displacement is reduced as a whole.

Figure 3:
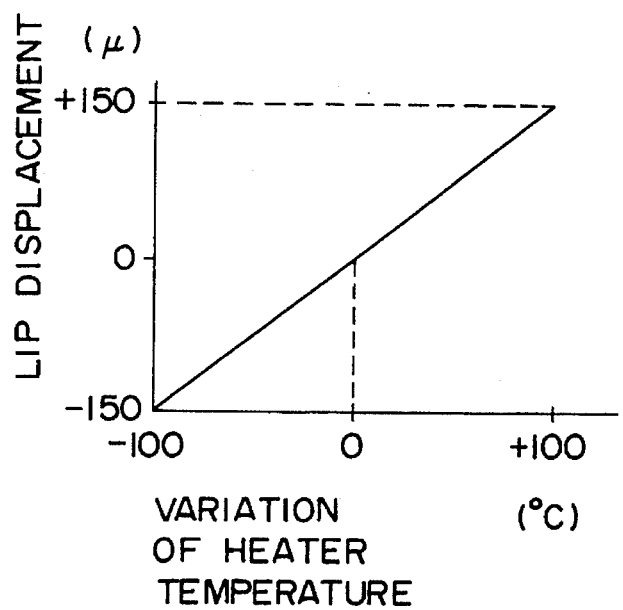
FIG. 3 is a view showing the relationship between the temperature and the displacement of the flexible lips established when there is backlash-less at the screw joint portions.

To avoid this, the lock nut 45 is tightened and locked. Thereupon, the backlash between the die bolt 30 and the heat sleeve 42, which are threadedly in engagement with each other, is completely suppressed by the nut 45, so that smooth continuous linear control can be continued without entering the dead zone corresponding to the backlash zone, as shown in FIG. 3, for example.

Moreover, an arrangement may be provided such that an alarm is given, and if necessary, an optimum manipulated variable for the hand-operated die bolts 28 is computed and displayed in case the thickness profile attains its upper or lower allowable limit value owing to any disturbance, such as the change of properties of the resin, during the automatic operation.

In this case, an operator can operate the hand-operated die bolts 28 in quick response while watching the display.

Figure 4:
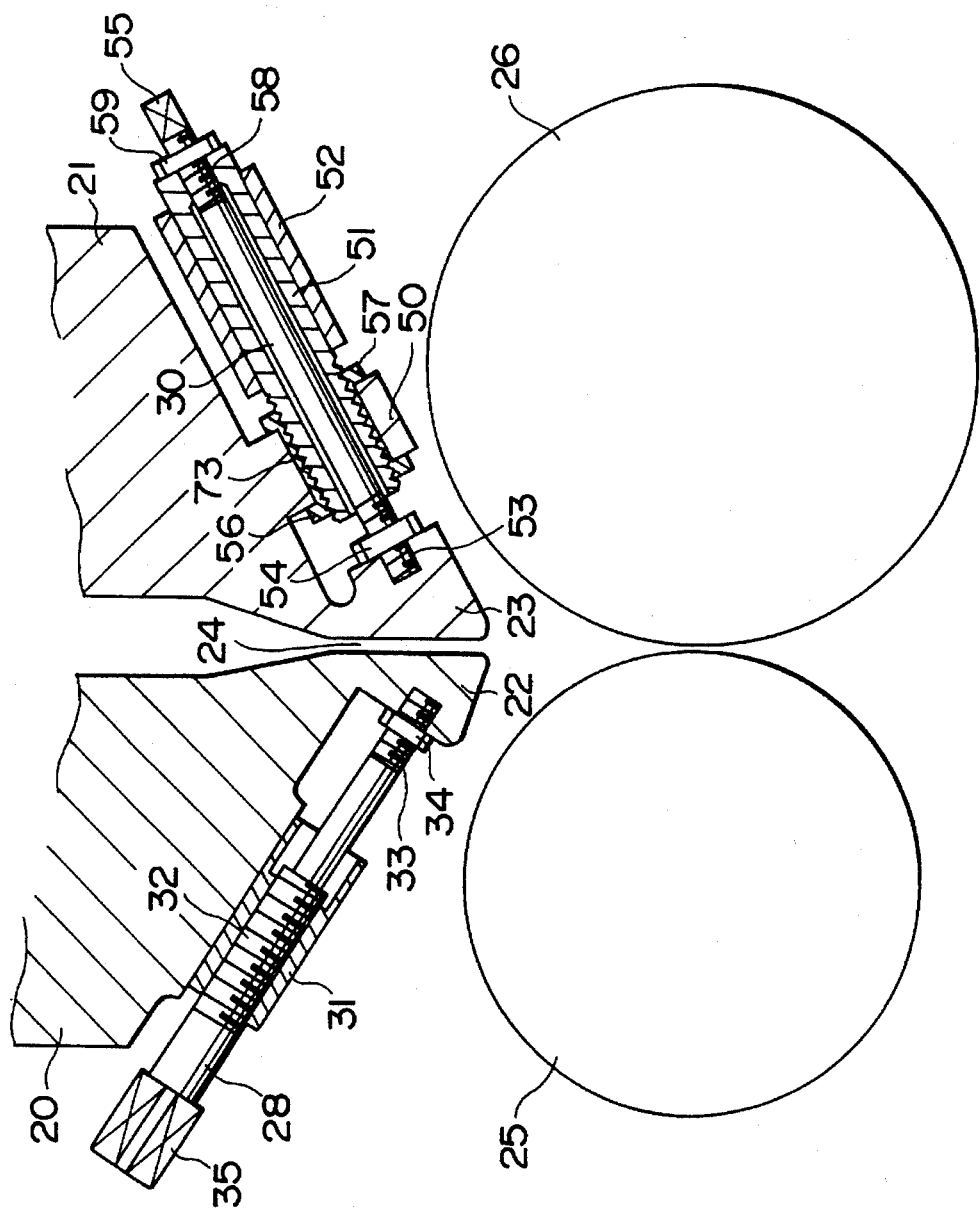
FIG. 4 is a sectional view showing a heat-displacing T-die according to another embodiment of the present invention provided with heat-displacing actuators of the reverse-acting type.
Figure 5:
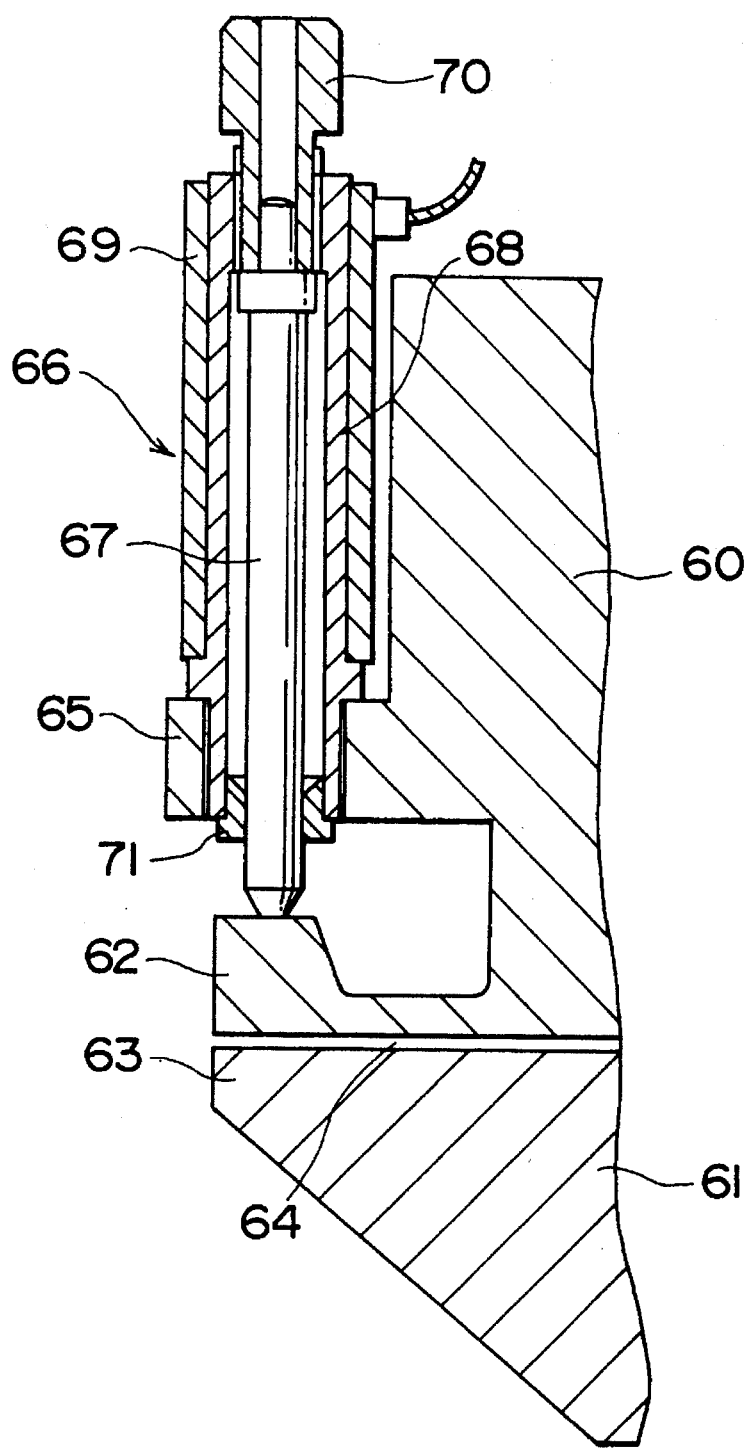
FIG. 5 is a sectional view showing an arrangement of a conventional heat-displacing T-die.

FIG. 4 is a view showing a heat-displacing T-die according to a second embodiment of the present invention.

In this embodiment, as in the first embodiment, hand-operated die bolts are arranged as die bolts 28 which are attached to a first die body 20. Heat reverse-acting actuators are used as heat-displacing actuators for urging die bolts 30, which are attached to a second die body 21, to push and pull a flexible lip 23. As in the first embodiment, the arrangement pitch of the die bolts 28 is shorter than that of the die bolts 30.

Each heat reverse-acting actuator is composed of a heat sleeve 51 and a sleeve heater 52 fitted tight on the sleeve 51. The die bolt 30 is coaxially inserted in the heat sleeve 51, and a male screw section 53 at its distal end portion is fastened to the flexible lip 23 by means of a lock nut 54. A male screw section 58 at the other end side of the die bolt 30 is threadedly in engagement with the free end side of the heat sleeve 51, and is fixed to the sleeve 51 by means of a lock nut 59 lest it be loosened. When the nut 59 is tightened, the backlash of the male screw section 58 is suppressed so that the die bolt 30 is fastened to the heat sleeve 51, as in the first embodiment.

On the other hand, a male screw section 73 is formed on the fixed end side of the heat sleeve 51. The male screw section 73 is fixed by being clamped by means of first and second operating nuts 56 and 57 from both sides of a mounting flange 50 which protrudes from the second die body 21. The nuts 56 and 57 serve as lock nuts, and besides, are used in initially positioning the heat sleeve 51.

In adjusting the flexible lip 23 in the push-direction by manual operation, the first operating nut 56 is tightened after first loosening the second operating nut 57 in advance. Thereupon, the heat sleeve 51 shifts its position toward the flexible lip 23, so that the lip 23 can be gradually pushed by means of the die bolt 30 which is connected to the sleeve 51. In adjusting the flexible lip 23 in the pull-direction, in contrast with this, the second operating nut 57 is tightened after first loosening the first operating nut 56. Thereupon, the heat sleeve 51 shifts its position away from the flexible lip 23, so that the lip 23 can be pulled.

In this heat reverse-acting actuator, materials with different coefficients of thermal expansion are used for the die bolt 30 and the heat sleeve 51, individually. For example, stainless steel is used for the heat sleeve 51, while low-thermalexpansion cast iron or engineering ceramics is used as a material for the die bolt 30 so that thermal expansion of the bolt 30 is smaller than that of the sleeve 51.

When the heat sleeve 51 is heated, it pulls the die bolt 30, since elongation of the bolt 30 is smaller than that of the sleeve 51, owing to this difference in thermal expansion. As a result, the load of pressure on the flexible lip 23 is reduced, so that the die slit gap 24 can be widened.

When the heat sleeve 51 is cooled, in contrast with this, it shrinks more than the die bolt 30, so that the bolt 30 pushes down the flexible lip 23, thereby narrowing the die slit gap 24.

According to the embodiment arranged in this manner, the die slit gap 24 is initially adjusted by means of the hand-operated die bolts 28, and automatic control operation for the thickness profile by means of the heat reverse-acting actuators is carried out in the same manner as in the first embodiment.

During the automatic operation, the backlash between the die bolt 30 and the heat sleeve 51, which are threadedly in engagement with each other, is removed by means of the lock nut 56, so that the change of the flexible lip 23 can be made to follow the change of the temperature of the heat sleeve 51 linearly, as in the first embodiment.

According to the present invention, as described above, the pair of lips are formed as movable lips, one of the movable lips having the hand-operated die bolts arranged thereon, the other having the die bolts automatically operated by means of the heat-displacing actuators. Since the arrangement pitch of the hand-operated die bolts is shorter than that of the automatically operated die bolts, the die slit gap can be initially adjusted throughout a wide range with satisfactory operativity by means of the hand-operated die bolts. In the thickness profile control during the automatic operation, on the other hand, the die slit gap can be automatically adjusted by means of the heat-displacing actuators. Moreover, the adjustment by means of the heat-displacing actuators can be complemented by adjusting the die slit gap by means of the hand-operated die bolts, depending on the operating conditions.

In each heat-displacing actuator, furthermore, the backlash can be removed by fixing a screw joint portion between the heat sleeve and the die bolt by means of the lock nut. Accordingly, there is no dead zone when the movement of each die bolt is changed from the push stroke to the pull stroke or from the pull stroke to the push stroke, so that the controllability for the flexible lip displacement can be improved further.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A heat-displacing T-die for extruding a sheet of a molten resin comprising a die slit gap defined between a pair of flexible lips, wherein the T-die is adapted for adjusting the die slit gap, said T-die further comprising:

a plurality of first hand-operated die bolts arranged widthwise on one of the flexible lips for moving the one lip to adjust the die slit gap;

a plurality of second die bolts arranged widthwise on the other of the flexible lips, an arrangement pitch of the first die bolts being shorter than an arrangement pitch of the second die bolts, the second die bolts having a distal end fixed to the other lip; and a plurality of heat direct-acting actuators, each actuator including a heater and a heat sleeve surrounding one of said second die bolts, having one end movably fixed to a mounting flange of the die and the other end constituting a free end on a side nearer to the flexible lip and having the heater fitted tight thereon, said head sleeve being formed of a material having a coefficient of thermal expansion higher than that of a material of the second die bolts, each second die bolt being fixedly fastened on the free end of the heat sleeve by means of mating threading on said free end and on said one second die bolt and by a lock nut on the mating threading of said one die bolt and abutting said free end, the actuators automatically operating the second die bolts to move the one lip to adjust the die slit gap.

2. The heat-displacing T-die according to claim 1, wherein said heat sleeve has a male screw section threadedly in engagement with a female screw section of the mounting flange of the die, and is fixedly positioned in a manner such that nuts are fitted and tightened on the male screw section on both sides of the mounting flange, individually.

3. A heat-displacing T-die for extruding a sheet of a molten resin comprising a die slit gap defined between a pair of flexible lips, wherein the T-die is adapted for adjusting the die slit gap, said T-die further comprising:

a plurality of first hand-operated die bolts arranged widthwise on one of the flexible lips for moving the one lip to adjust the die slit gap;

a plurality of second die bolts arranged widthwise on the other of the flexible lips, an arrangement pitch of the first die bolts being shorter than an arrangement pitch of the second die bolts, the second die bolts having a distal end fixed to the other lip; and a plurality of heat reverse-acting actuators, each actuator including a heater and a heat sleeve surrounding one of said second die bolts, having one end movably fixed to a mounting flange of the die and the other end constituting a free end on a side remote from the flexible lip and having the heater fitted tight thereon, said heat sleeve being formed of a material having a coefficient of thermal expansion higher than that of a material of the second die bolts, each second die bolt being fixedly fastened on the free end of the heat sleeve by means of mating threading on said free end and on said one second die bolt and by a lock nut on the mating threading of said one die bolt and abutting said free end, the actuators automatically operating the second die bolts to move the one lip to adjust the die slit gap.

4. The heat-displacing T-die according to claim 3, wherein said heat sleeve has a male screw section threadedly in engagement with a female screw section of the mounting flange of the die, and is fixedly positioned in a manner such that nuts are fitted and tightened on the male screw section on both sides of the mounting flange, individually.

* * * * *